United States Patent
Ahn et al.

(10) Patent No.: US 8,045,114 B2
(45) Date of Patent: Oct. 25, 2011

(54) LIQUID CRYSTAL DISPLAY DEVICE COMPRISING AN ELECTRIC FIELD DISTORTION UNIT AND THE PASSIVATION LAYER IS DIRECTLY CONTACTED ON THE FIRST SUBSTRATE OF THE PIXEL REGION

(75) Inventors: Ji Young Ahn, Gyeonggi-do (KR); Hyeon Ho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/857,795

(22) Filed: Aug. 17, 2010

(65) Prior Publication Data

US 2010/0309418 A1    Dec. 9, 2010

Related U.S. Application Data

(62) Division of application No. 11/400,305, filed on Apr. 10, 2006, now Pat. No. 7,796,220.

(30) Foreign Application Priority Data

Apr. 11, 2005  (KR) .................. 10-2005-0029982

(51) Int. Cl.
*G02F 1/1337*  (2006.01)
*G02F 1/1333*  (2006.01)

(52) U.S. Cl. .................. 349/129; 349/130; 349/138

(58) Field of Classification Search .......... 349/129–130, 349/138

See application file for complete search history.

(56) References Cited

U.S. PATENT DOCUMENTS

| | | | |
|---|---|---|---|
| 6,407,791 B1 * | 6/2002 | Suzuki et al. | 349/129 |
| 7,206,057 B2 | 4/2007 | Yoo et al. | |
| 2002/0159018 A1 * | 10/2002 | Kataoka et al. | 349/143 |
| 2004/0090581 A1 | 5/2004 | Song et al. | |
| 2005/0036091 A1 | 2/2005 | Song | |

* cited by examiner

*Primary Examiner* — Mark Robinson
*Assistant Examiner* — Charles Chang
(74) *Attorney, Agent, or Firm* — Morgan, Lewis & Bockius LLP

(57) ABSTRACT

A liquid crystal display device includes: a first substrate and a second substrate; a gate line and a data line on the first substrate that cross each other to define a pixel region; a pixel electrode in the pixel region; a thin film transistor at the crossing of the gate and data lines, and connected to the pixel electrode; at least one first electric field distortion unit in the pixel electrode to control a liquid crystal director by electric field distortion; a second electric field distortion unit between the pixel electrode and the first substrate; and a layer of liquid crystal molecules between the first and second substrates.

3 Claims, 6 Drawing Sheets

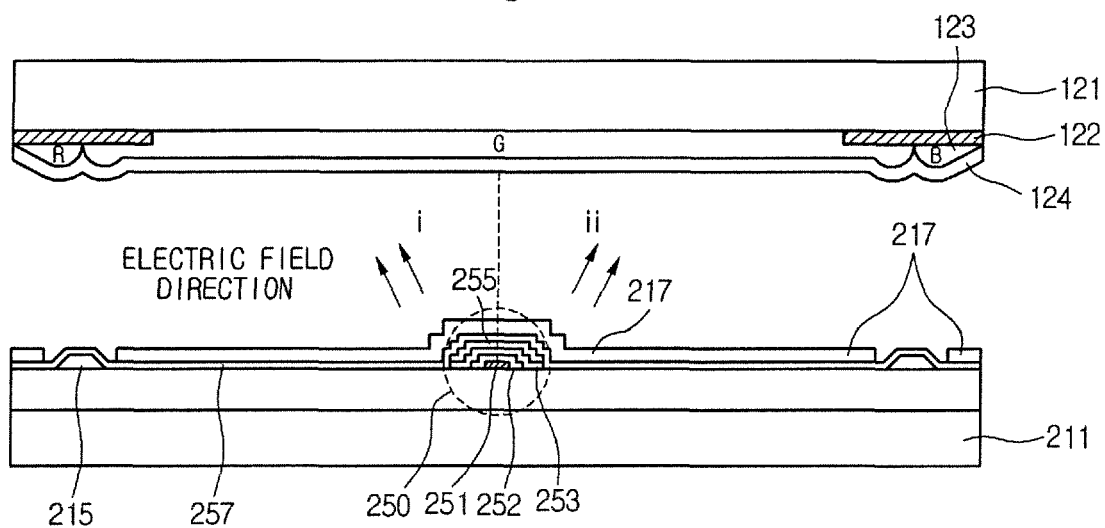

LIQUID CRYSTAL DISPLAY DEVICE COMPRISING AN ELECTRIC FIELD DISTORTION UNIT AND THE PASSIVATION LAYER IS DIRECTLY CONTACTED ON THE FIRST SUBSTRATE OF THE PIXEL REGION

This is a divisional application of application Ser. No. 11/400,305, filed on Apr. 10, 2006 now U.S. Pat. No. 7,796, 220, which is hereby incorporated by reference.

The present invention claims the benefit of Korean Patent Application No. 029982/2005 filed in Korea on Apr. 11, 2005, which is hereby incorporated by reference in its entirety.

BACKGROUND OF THE INVENTION

1. Field of the Invention

The present invention relates to a display device, and more particularly, to a liquid crystal display device. Although the present invention is suitable for a wide scope of applications, it is particularly suitable for forming multi-domains in each of the pixels of a liquid crystal display device.

2. Description of the Related Art

One of the types of liquid crystal displays (LCDs) typically used in most recent years is a twisted nematic (TN) mode LCD. The structure of a TN mode LCD includes two substrates on which respective electrodes are formed and a layer of liquid crystal molecules between the two substrates. The liquid crystal molecules within the layer have a long shape oriented parallel to each of the two substrates with a constant pitch, and are spirally twisted. Thus, a liquid crystal director can be oriented when a voltage is applied across the electrodes on the two substrates.

The TN mode LCD has been increasingly used and researched because it provides excellent color reproducibility. However, since light is not completely cut off during the off-state in a TN mode LCD, a contrast ratio is poor. Further the contrast ratio varies with a viewing angle. Accordingly, it is difficult to present a stable image because halftone brightness varies as the viewing angle is varied. In other words, the appearance of an image depends on the angle at which the LCD is viewed.

To address image variation due to different angles of viewing, various types of LCDs have been proposed to present a stable image over a wide range of viewing angles. For example, an in-plane switching mode (IPS) LCD having two electrodes disposed on one plane such that a transverse electric field is generated across the electrodes to reliably cut off light during the off-state has been developed. In another example, a film-compensated mode LCD has been developed in which a compensation film compensates for image variation due to change in the angle in which the LCD is viewed. In yet another example, a vertical alignment (VA) mode LCD has been developed that uses a vertical alignment layer and a negative liquid crystal with a negative dielectric anisotropy to reliably cut off light during the off-state.

The VA mode LCD is mainly classified into a multi-domain vertical alignment (MVA) mode LCD in which a plurality of domains are formed and a liquid crystal direction of each domain is different, and an advanced super-V (ASV) mode LCD in which a pixel electrode is divided into small parts and a liquid crystal direction is controlled by a rib in a central portion of the divided pixel electrode. The MVA mode LCD and the ASV mode LCD are configured such that the liquid crystal directors are opposite to each other to compensate for image variations due to change in the angle in which the LCD is viewed. Therefore, the MVA mode and ASV mode enable the LCD to present a consistent image throughout a wide range of viewing angles.

FIG. 1 is a plan view of the related art MVA mode LCD, and FIG. 2 is a cross-sectional view taken along the line I-I' of FIG. 1. Referring to FIGS. 1 and 2, the related art MVA mode LCD includes an upper substrate 21, a lower substrate 11 and a layer of liquid crystal molecules interposed therebetween. Herein, the lower substrate 11 includes a gate line 12 and a data line 15, which are respectively arranged in row and column directions, and cross each other so as to define a pixel region. A pixel electrode 17 is formed in the pixel region. A thin film transistor (TFT) is formed in adjacent to a crossing of the gate line 12 and the data line 15, and a plurality of first electric field distortion units 33 is formed in a predetermined region of the pixel electrode 17 for controlling a liquid crystal director through electric field distortion. The TFT is selectively switched by a scan signal of the gate line 12 so as to apply a data signal of the data line 15 to the pixel electrode 17.

As shown in FIG. 1, the first electric field distortion unit 33 has the shape of a slit, which is formed by selectively removing a portion of the pixel electrode 17. Meanwhile, the TFT is configured with a gate electrode 12a extending from the gate line 12, a gate insulating layer 16 on the gate electrode, a semiconductor layer 18 formed on the gate electrode in a shape of an island, source/drain electrodes 19 and 15a that extend from the data line 15, and the pixel electrode 17.

Although not illustrated in FIGS. 1 and 2, the lower substrate 11 further includes a storage capacitor parallel to the gate line 12. The storage capacitor maintains a charged voltage in the liquid crystal layer while the TFT is turned off so that it prevents image quality from deteriorating.

The upper substrate 21 includes a black matrix 22 for preventing light leakage, a color filter layer 23 of red, green and blue formed between the black matrix layers 22 for displaying a color on a screen, a common electrode 24 stacked on the color filter layer 23 such that it is opposite to the pixel electrode 17 of the lower substrate 11, a plurality of second electric field distortion units 31 formed in a predetermined region of the common electrode 24 for controlling the liquid crystal director by the electric field distortion. Although it is illustrated in FIG. 1 that the second electric field distortion unit 31 has the shape of a rib, which is formed by separately depositing a dielectric material on the common electrode 24 followed by patterning a conductive material, the second electric field distortion unit 31 may be formed in a shape of a slit within the conductive material like the first electric field distortion unit 33.

As shown in FIG. 1, the first and second electric field distortion units 33 and 31 are alternately arranged in the shape of oblique lines which are parallel to each other, to thereby form multi-domains. However, in case of the related art VA mode LCD, it is necessary to perform a deposition process of a dielectric material on the upper substrate 21 as well as patterning processes to pattern an ITO electrode to form the second electric field distortion unit 31 in the shape of a rib or slit, as shown in FIG. 2. Therefore, there is a drawback in that the number of the process inevitably increases the implementation of multi-domains in each pixel region.

SUMMARY OF THE INVENTION

Accordingly, the present invention is directed to a liquid crystal display device (LCD) and a method of fabricating the same that substantially obviate one or more problems due to limitations and disadvantages of the related art.

An object of the present invention is to reduce the number of fabrication process steps for forming multi-domains in each of the pixels of a liquid crystal display device. and enhancing an aperture ratio by structuring the LCD.

Another object of the present invention is to enhance an aperture ratio of multi-domains in each of the pixels of a liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device including: a first substrate and a second substrate; a gate line and a data line on the first substrate that cross each other to define a pixel region; a pixel electrode in the pixel region; a thin film transistor at the crossing of the gate and data lines, and connected to the pixel electrode; at least one first electric field distortion unit in the pixel electrode to control a liquid crystal director by electric field distortion; a second electric field distortion unit between the pixel electrode and the first substrate; and a layer of liquid crystal molecules between the first and second substrates.

In another aspect of the present invention, there is provided a liquid crystal display device including: a first substrate and a second substrate; a gate line and a data line on the first substrate that cross each other to define a pixel region; a pixel electrode in the pixel region; a thin film transistor in an intersection region of the gate and data interconnections, and connected to the pixel electrode; at least one electric field distortion unit between the pixel electrode and the first substrate such that the at least one electric field distortion unit divides the pixel electrode into two or more parts to control a liquid crystal director by electric field distortion; and a layer of liquid crystal molecules between the first and second substrates.

In yet another aspect of the present invention, a method of manufacturing a liquid crystal display device having a first substrate and a second substrate includes: forming a gate line and a data line on the first substrate that cross each other to define a pixel region; forming a pixel electrode in the pixel region; forming a thin film transistor at the crossing of the gate and data lines, and connected to the pixel electrode; forming an electric field distortion unit between the pixel electrode and the first substrate; and providing a layer of liquid crystal molecules between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the Drawings:

FIG. 6 is a cross-sectional view taken along the line of FIG. 5.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
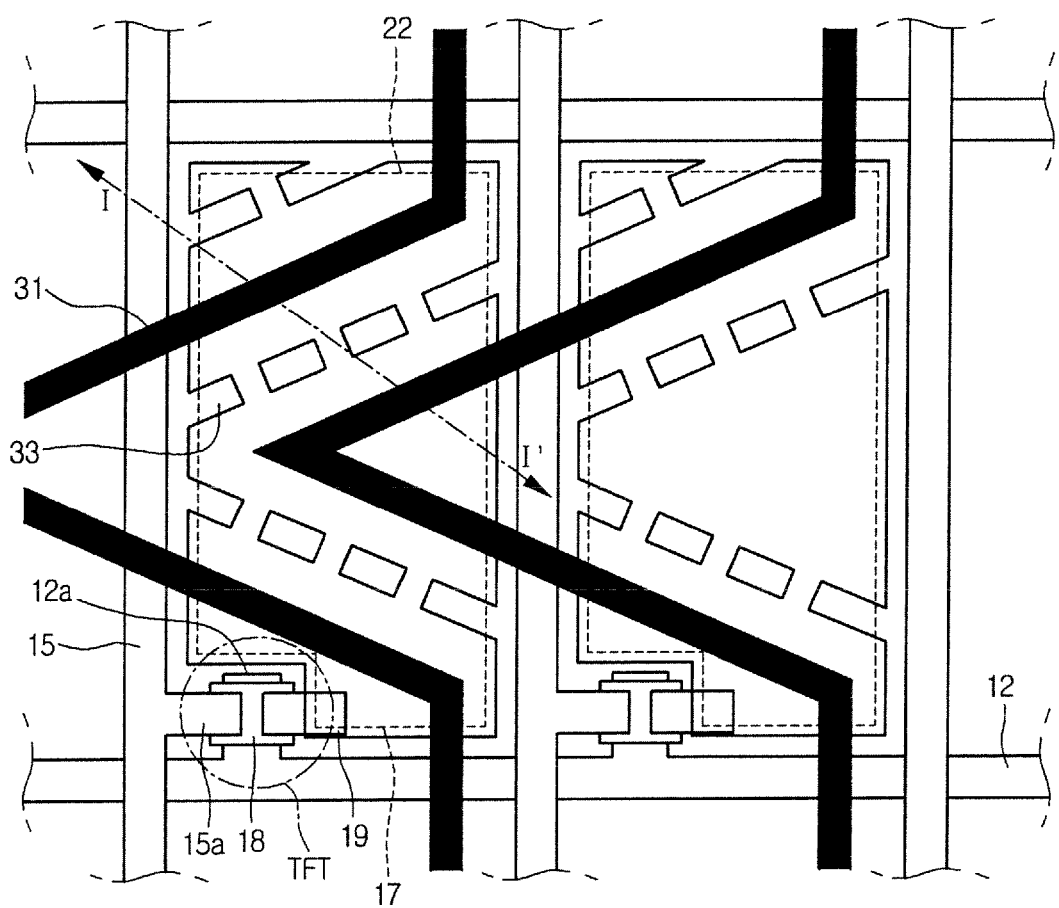
FIG. 1 is a plan view of the related art MVA mode liquid crystal display device (LCD)
Figure 2:
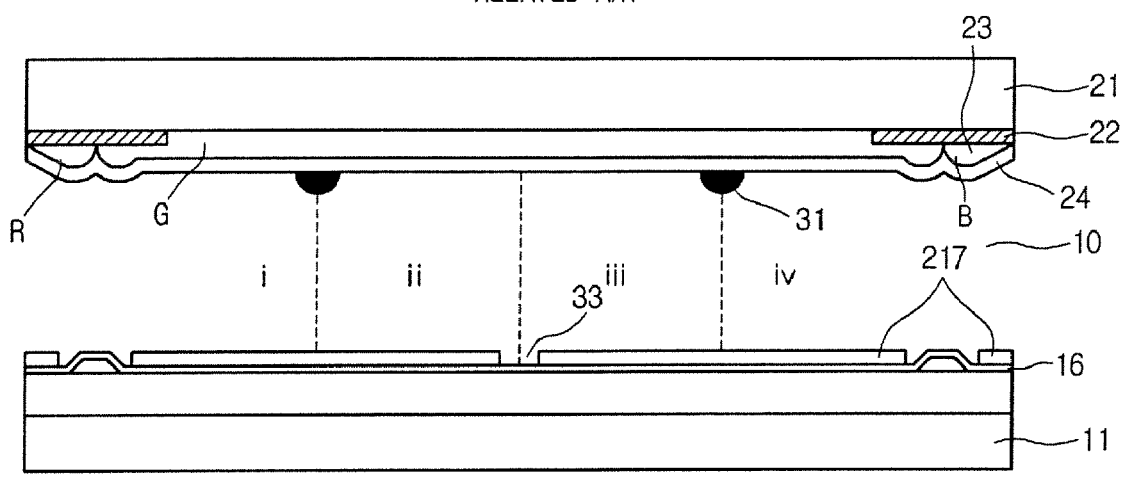
FIG. 2 is a cross-sectional view taken along the line I-I' of FIG. 1.
Figure 3:
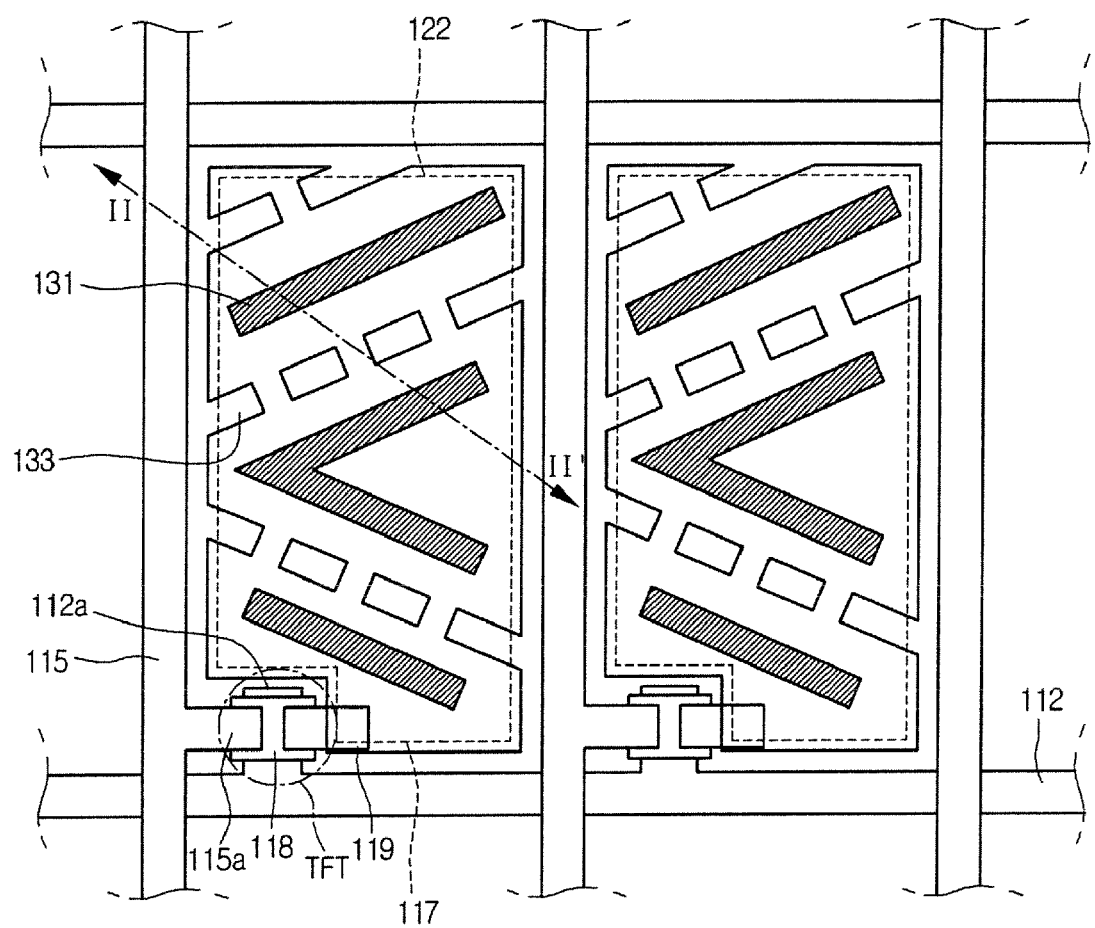
FIG. 3 is a plan view of an LCD according to an embodiment of the present invention.
Figure 4:
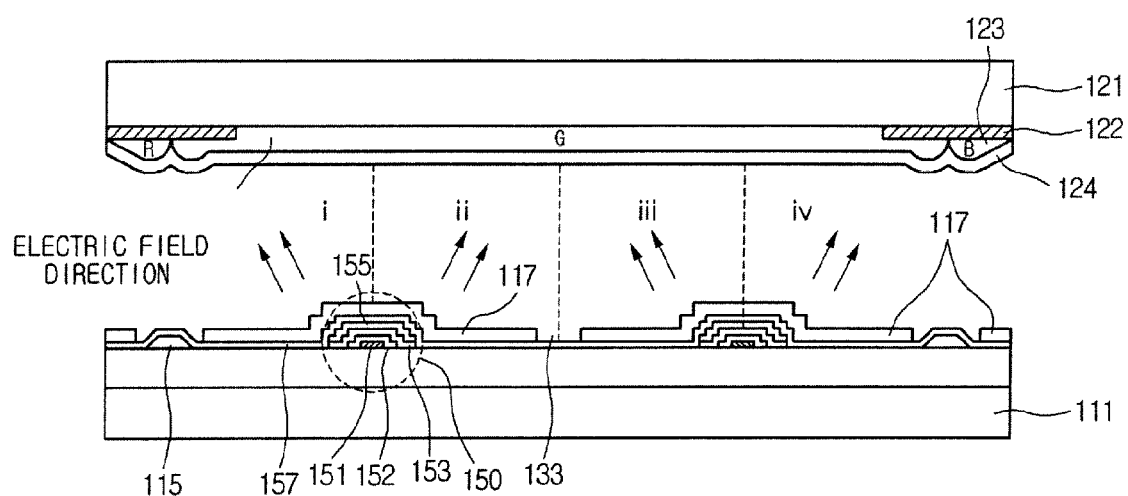
FIG. 4 is a cross-sectional view taken along the line II-II" of FIG. 3.

FIG. 3 is a plan view of an LCD according to an embodiment of the present invention, and FIG. 4 is a cross-sectional view taken along the line II-II' of FIG. 3. Referring to FIGS. 3 and 4, the MVA mode LCD in an embodiment of the present invention includes an upper substrate 121, a lower substrate 111 and a layer of liquid crystal molecules interposed therebetween. The lower substrate 111 includes a gate line 112 and a data line 115, which are respectively arranged in a row direction and a column direction, and cross each other to define a pixel region. A pixel electrode 117 is formed in the pixel region. A thin film transistor is (TFT) formed adjacent to the crossing of the gate line 112 and the data line 115. A plurality of first electric field distortion units 133 is formed in a predetermined region of the pixel electrode 117 for controlling a liquid crystal director by electric field distortion, and a second electric field distortion unit 131 is formed and parallel to the first electric field distortion unit 133. The TFT is selectively switched by a scan signal of the gate line 112 so as to apply a data signal from the data line 115 to the pixel electrode 117.

In embodiments of the present invention, both the first and second electric field units 131 and 133, which are used for forming multi-domains, are formed on the lower substrate 111. More particularly, the first electric field distortion unit 133 is a series of slits formed by selectively removing portions of the pixel electrode 117, and the second electric field distortion unit 131 is a stepped portion 150 obtained by forming at least one gate metal layer 151 between the pixel electrode 117 and the lower substrate 111. As illustrated in FIG. 3, the first and second electric field distortion units 133 and 131 are in the shape of oblique lines alternately arranged and parallel to each other. The first electric field distortion unit 133 and the second electric field distortion unit 131 form multi-domains in one pixel region.

The TFT includes a gate electrode 112a extending from the gate line 112, a gate insulating layer 152 formed on the gate electrode 112a, a semiconductor layer 118 formed on the gate electrode in the shape of an island, source/drain electrodes 115a and 119, which extend from the data line 115, and the pixel electrode 117. The TFT is formed by a process including three to five masking steps. In embodiments of the present invention, the stepped portion 150 of the second electric field distortion unit 131 is simultaneously formed during the formation of the TFT to implement the multi-domains in one pixel without additional fabrication processes. More particularly, the stepped portion 150, which is simultaneously formed with the TFT, includes a gate metal layer 151, a gate insulating layer 152, a semiconductor layer 153, a source/drain electrode layer 155, and a passivation layer 157 stacked in sequence. The pixel electrode 117 is formed over the entire surface of the stepped portion 150.

The TFT can be formed with a three step masking process using a lift-off process having a high step. Further, since the same three step masking process can form a stepped portion 150 of the second electric field distortion unit 131, it is suitable to implement the multi-domain because electric field distortion is effectively generated. In the alternative, the stepped portion 150 of the second electric field distortion unit 131 and the TFT can be formed with either a four or five step masking process. The TFT can be formed with a three step masking process using a halftone mask or a diffractive mask.

The upper substrate 121 includes a black matrix 122 for preventing light leakage, a color filter layer 123 of red, green and blue formed between the black matrix layers 122 for displaying a color on a screen. A common electrode 124 stacked on the color filter layer 123 such that it is opposite to the pixel electrode 117 of the lower substrate 111. Unlike the related art, an electric field distortion unit, such as a rib or a slit, is not formed on the upper substrate 121.

According to embodiments of the present invention, there are no additional process for forming an electric field distortion unit, such as a rib or a slit. In other words, it is not necessary to perform a deposition process of a dielectric material on the upper substrate or a patterning processes to form an electric field distortion unit on the upper substrate like in the related art. Instead, a stepped portion is formed on the lower substrate that acts as the electric field distortion unit such the multi-domains can be obtained without additional fabrication processes.

Although not shown in FIGS. 3 and 4, the MVA mode LCD further includes a vertical alignment layer on inside surfaces of the pixel electrode 117 and the common electrode 124 for controlling the arrangement of the liquid crystal molecules in the liquid crystal layer of the MVA mode LCD. The MVA mode LCD employs liquid crystal molecules with a negative dielectric anisotropy. The major axis of each liquid crystal molecule is initially arranged perpendicular to the lower substrate 111 using alignment layers (not shown) on the upper and lower substrates 121 and 111.

As shown in FIG. 4, each pixel region is divided into four regions (denoted as i, ii, iii and iv in FIG. 4) using the first and second electric field distortion units 131 and 133 formed on the lower substrate 111 to implement the multi-domains. In addition, the gate metal layer 151, which is an element of the stepped portion 150 of the second electric field distortion unit 131, may constitute a storage capacitor together with the pixel electrode 117 and the passivation layer 157. That is, a storage capacitor is implemented by applying a common voltage Vcom to the gate metal layer 151. Therefore, the storage capacitor maintains a voltage across the layer of liquid crystal molecules while the TFT is turned off so as to prevent the image quality from deteriorating.

In the related art VA mode LCD, a linewidth of the gate line is increased because the gate line is used as the lower electrode of the storage capacitor. However, according to embodiments of the present invention, the storage capacitor may be formed in the center of the pixel and the linewidth of the gate line can be reduced. Because the linewidth of the gate line can be reduced, the aperture ratio of the LCD can be increased.

To implement the multi-domains in the related art TN mode LCD, several different methods can be employed, such as a method using a tilt difference between the alignment layers of the upper and lower substrates, a multi-rubbing method or a photo-alignment method. The method using the tilt difference has a problem in that a large number of process steps are required. The multi-rubbing method also has a problem of requiring a large number of process steps as well as causing a shadow effect that reduces the aperture ratio. The photo-alignment method has a shortcoming in that alignment forces for aligning liquid crystal molecules are weak such that reliability is poor.

Figure 5:
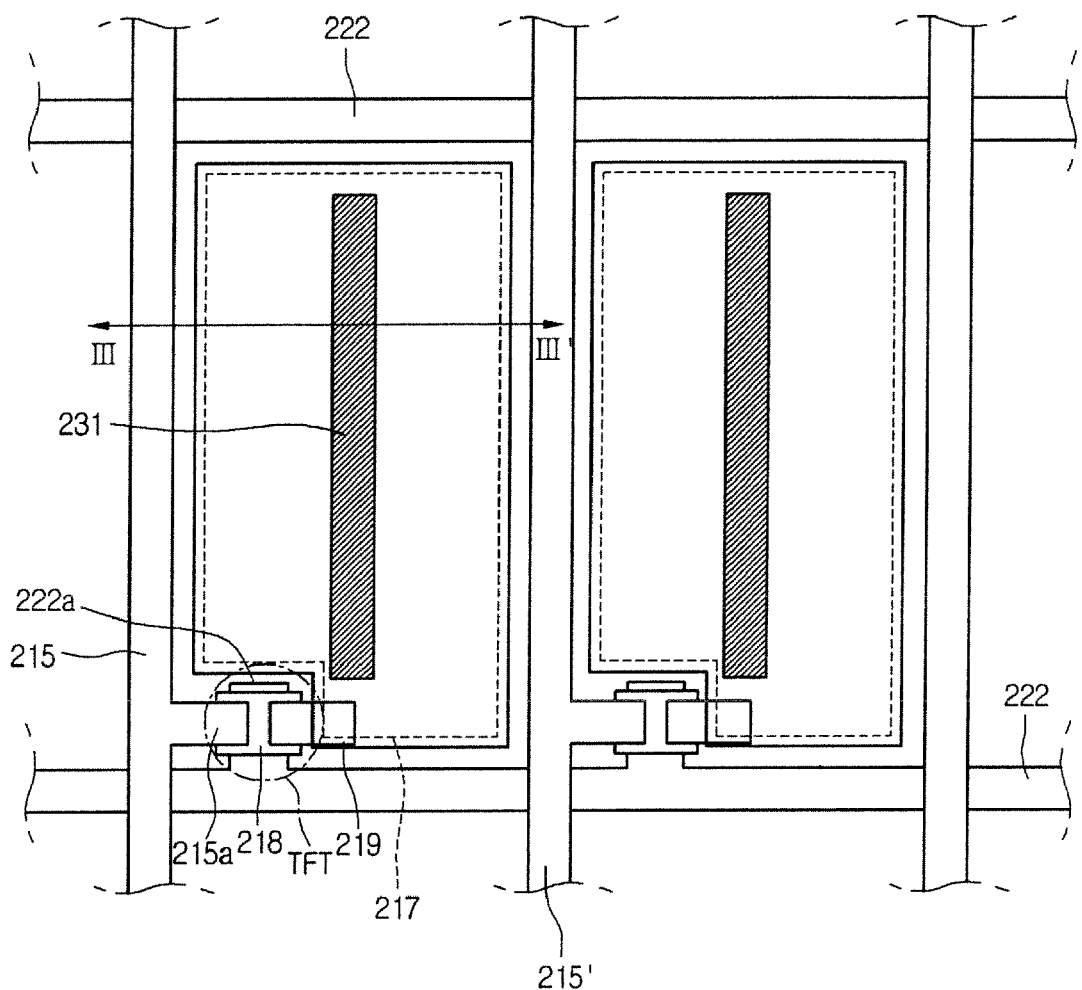
FIG. 5 is a plan view of an LCD according to another embodiment of the present invention.

FIG. 5 is a plan view of an LCD according to another embodiment of the present invention, and FIG. 6 is a cross-sectional view taken along the line III-III' of FIG. 5. More specifically, a twisted nematic (TN) LCD is illustratively set forth in FIG. 5. In the TN mode LCD according to another embodiment of the present invention the electric field distortion unit is formed on the lower substrate such that the pixel region is divided into at least two parts such that multi-domains can be implemented. The electric field distortion unit is formed as a stepped portion 250 and is simultaneously formed with the TFT in each pixel region.

Referring to FIGS. 5 and 6, the TN mode LCD according to another embodiment of the present invention includes an upper substrate 221, a lower substrate 211 and a layer of liquid crystal molecules interposed therebetween. The lower substrate 211 includes a gate line 212 and a data line 215 which are arranged in rows and columns and intersected with each other so as to define a pixel region, a pixel electrode 217 formed in the pixel region, a TFT formed in an intersection region of the gate line 212 and the data line 215, at least one electric field distortion unit(s) 231 formed such that the pixel region is divided into at least two parts for controlling a liquid crystal director through electric field distortion. The TFT is selectively switched by a scan signal of the gate line 212 so as to apply a data signal of the data line 215 to the pixel electrode 217.

Herein, the electric field distortion unit 231 has a stepped portion 250 obtained by forming a gate metal layer under the pixel electrode 217. In an embodiment of the present invention shown in FIGS. 5 and 6, the stepped portion 250 of the electric field distortion unit 231 is simultaneously formed during the formation of the TFT to implement the multi-domains in a pixel region without additional fabrication processes. More particularly, the stepped portion 250, which is simultaneously formed with the TFT, includes a gate metal layer 251, a gate insulating layer 252, a semiconductor layer 253, a source/drain electrode layer 255, and a passivation layer 257 stacked in sequence. The pixel electrode 217 is formed over the entire surface of the stepped portion 250. As shown in FIG. 5, the electric field distortion unit 231 is formed longitudinally in central portion of the pixel region and parallel to the data lines 215 and 215'. As shown in FIG. 6, electric field distortion occurs due to the step in the central region of the pixel region such the multi-domains occur between the pixel electrode 217 and the data lines 215 and 215'.

The TFT includes a gate electrode 222a extending from the gate line 222, a gate insulating layer 152 formed on the gate electrode 222a, a semiconductor layer 218 formed on the gate electrode in the shape of an island, source/drain electrodes 215a and 219, which extend from the data line 215, and the pixel electrode 217. The TFT is formed by a process including three to five masking steps. In embodiments of the present invention, the stepped portion 250 of the second electric field distortion unit 231 is simultaneously formed during the formation of the TFT to implement the multi-domains in one pixel region without additional fabrication processes.

The TFT can be formed with a three step masking process using a lift-off process having a high step. Further, since the same three step masking process can form a stepped portion 250 of the second electric field distortion unit 131, it is suitable to implement the multi-domain because electric field distortion is effectively generated. In the alternative, the stepped portion 250 of the second electric field distortion unit 231 and the TFT can be formed with a four or five step masking process.

The upper substrate 121 includes a black matrix 122 for preventing light leakage, a color filter layer 123 of red, green and blue formed between the black matrix layers 122 for displaying a color on a screen. A common electrode 124 stacked on the color filter layer 123 such that it is opposite to the pixel electrode 117 of the lower substrate 111. Unlike the related art, an electric field distortion unit, such as a rib or a slit, is not formed on the upper substrate 121

According to embodiments of the present invention, it is possible to easily form the multi-domains in the respective pixel regions without any supplementary, process by forming the stepped portion, which is formed on the lower substrate of the LCD, in a predetermined portion of each pixel region in a matrix. In the related art TN mode LCD, a linewidth of the gate line is increased because the gate line is used as the lower electrode of the storage capacitor. However, according to embodiments of the present invention, the storage capacitor may be formed in the center of the pixel region and the linewidth of the gate line can reduced. Because the linewidth of the gate line can be reduced, the aperture ratio of the LCD can be increased. The shape of the stepped portion in the above embodiments are mere exemplary and is not limited to those described above.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising: a first substrate and a second substrate; a gate line and a data line on the first substrate that cross each other to define a pixel region; a pixel electrode in the pixel region; a thin film transistor in an intersection region of the gate and data interconnections, and connected to the pixel electrode; at least one electric field distortion unit between the pixel electrode and the first substrate such that the at least one electric field distortion unit divides the pixel electrode into two or more parts to control a liquid crystal director by electric field distortion; and a layer of liquid crystal molecules between the first and second substrates, wherein the at least one electric field distortion unit is a stepped portion including a gate metal layer, wherein the stepped portion includes a gate insulating layer, a semiconductor layer, a source/drain electrode layer and a passivation layer, and the pixel electrode is over the stepped portion, wherein the gate metal layer, the gate insulating layer, a semiconductor layer and the source/drain electrode layer of the stepped portion are patterned in a slit form and they are stacked in sequence, wherein the passivation layer of the stepped portion is directly contacted on the source/drain electrode layer patterned in the slit form and the first substrate of the pixel region, and wherein the at least one electric field distortion unit is parallel to the data line.

2. The liquid crystal display device according to claim 1, wherein the gate metal layer, the passivation layer, and the pixel electrode form a storage capacitor.

3. The liquid crystal display device according to claim 1, wherein the liquid crystal display device is twisted nematic mode.

* * * * *